United States Patent [19]
Conrad et al.

[11] Patent Number: 6,028,605
[45] Date of Patent: Feb. 22, 2000

[54] MULTI-DIMENSIONAL ANALYSIS OF OBJECTS BY MANIPULATING DISCOVERED SEMANTIC PROPERTIES

[75] Inventors: Tom Conrad, Chicago, Ill.; Scott Wiener, San Francisco, Calif.

[73] Assignee: Documentum, Inc., Pleasanton, Calif.

[21] Appl. No.: 09/017,823

[22] Filed: Feb. 3, 1998

[51] Int. Cl.[7] .................................................. G06F 15/00
[52] U.S. Cl. .............................. 345/354; 345/352; 707/3; 707/4
[58] Field of Search ..................................... 345/352, 353, 345/354; 707/3, 4, 5, 6, 102, 103

[56] References Cited

U.S. PATENT DOCUMENTS

| | | | |
|---|---|---|---|
| 5,717,925 | 2/1998 | Harper et al. | 707/102 |
| 5,862,325 | 1/1999 | Reed et al. | 395/200.31 |
| 5,873,076 | 2/1999 | Barr et al. | 707/3 |

OTHER PUBLICATIONS

Gary C. Hoge et al, "Action Writer", US Patent & Trademark Office, 1993, pp. 3.1–3, 3.2–7 and Corresponding Screen Dumps 1, 2.

Primary Examiner—Ba Huynh

[57] ABSTRACT

A computer graphical user interface (GUI) for multi-dimensional analysis of objects by manipulating discovered semantic properties. A computer system robotically builds a semantic model of information contained on an information retrieval system such as the Internet. The semantic model is stored as metadata in an intermediate format on the computer system. The computer system performs a semantic analysis on the metadata and generates search results in response to user queries. The GUI allows a user to select resource metadata and accumulate the metadata into a query definition. The GUI dynamically extracts metadata from user-selected query results and displays the results grouped by types or categories of metadata. The query results may be also displayed on screen in a sidebar. A user may pin metadata items and display changes to the query results based upon the pinned items. The GUI further displays user preference feedback to the user and uses the feedback to modify subsequent queries and displayed search results.

10 Claims, 20 Drawing Sheets

MULTI-DIMENSIONAL ANALYSIS OF OBJECTS BY MANIPULATING DISCOVERED SEMANTIC PROPERTIES

FIELD OF THE INVENTION

This invention relates generally to computer graphical user interfaces, and more particularly, to a graphical user interface for multi-dimensional analysis of objects by manipulating discovered semantic properties.

BACKGROUND OF THE INVENTION

Information retrieval systems such as the Internet have given users unparalleled access to information from a wide variety of sources. However, in many cases, the information is not indexed or categorized in any meaningful way. Even for information systems which provide an abstract, summary, key words, or indexing of materials contained in the system, users may only be able to perform limited key word searches on the materials and may find it extremely difficult to locate and categorize information in an efficient and organized way.

State of the art key word searches are still primitive. A user is typically presented with a blank screen or prompt and asked to type individual key words or a short phrase to search for. While key word searches may find some relevant materials, a large number of irrelevant materials are often generated and relevant materials are missed. In addition, the user is required to know the typical terms, phrases, alternate spellings and abbreviations associated with the information category being searched. The user may be given some options on limiting the search to various broad sections of the information retrieval system (e.g. the web, usenet, gopher servers, WAIS databases, etc.), but still may end up searching and producing vast numbers of references which are not relevant. The user may also be given the option of controlling the search through the use of boolean operators such as AND, OR, and NOT, and wildcard operators and root expanders such as * and !, but these still require a sophisticated user with a detailed knowledge of the subject matter to be searched.

The results of a key word search are also primitive and may not be presented to the user in any meaningful way. Entries are typically presented chronologically or by a percentage factor which looks only at how many of the search key words were found in the entry. Further, the relationships which exist between individual entries of the search results may not be apparent to the user. The user may also be limited in extracting information from the search results and using those results to refine or create subsequent searches.

Therefore, there is a need for a way to search information retrieval systems in an efficient and meaningful way without requiring that a user be an expert in the search technology. There is a further need for a way to report the results of a search in an organized fashion which presents the information by categories and illustrates relationships between entries. There is also a need for a way to enable a user to extract information from the search results and use those results to refine or create subsequent searches.

SUMMARY OF THE INVENTION

The present invention provides a computer graphical user interface (GUI) for multi-dimensional analysis of objects by manipulating discovered semantic properties. A computer system robotically builds a semantic model of information contained on an information retrieval system such as the Internet. The semantic model is stored as metadata in an intermediate format on the computer system. The computer system performs a semantic analysis on the metadata and generates search results in response to user queries. The GUI allows a user to select resource metadata and accumulate the metadata into a query definition. The GUI dynamically extracts metadata from user-selected query results and displays the results grouped by types or categories of metadata. The query results may be also displayed on screen in a sidebar. A user may pin metadata items and display changes to the query results based upon the pinned items. The GUI further displays user preference feedback to the user and uses the feedback to modify subsequent queries and displayed search results.

DESCRIPTION OF THE DRAWINGS

The present invention is illustrated by way of example by the accompanying drawings, in which like references indicate similar elements and in which.

DETAILED DESCRIPTION OF A PREFERRED EMBODIMENT OF THE PRESENT INVENTION

Figure 1:
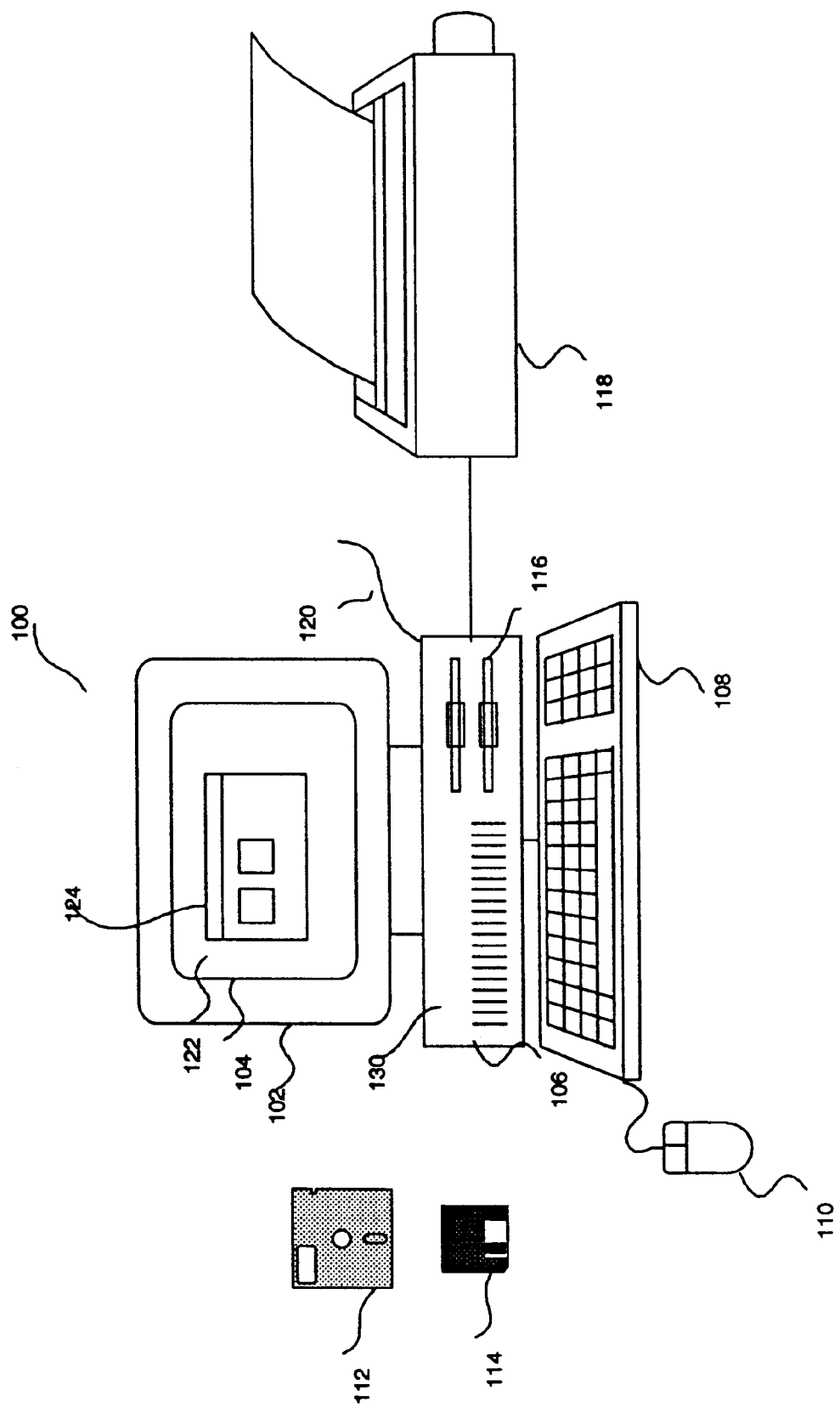
FIG. 1 is a system diagram which shows a computer hardware environment compatible with the present invention.

In the following description of a preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

For purposes of explanation, numerous specific details are set forth in the following description in order to provide a thorough understanding of the present invention. However, it will be evident to one of ordinary skill in the art that the present invention may be practiced without some of these specific details. In other instances, well-known structures and devices are shown in block diagram form in order to facilitate description.

In one embodiment, steps according to the present invention are embodied in machine-executable software instructions, and the present invention is carried out in a processing system by a processor executing the instructions. In other embodiments, hardwired circuitry may be used in place of, or in combination with, software instructions to implement the present invention.

The present invention provides a graphical user interface (GUI) for searching information retrieval systems such as the Internet in an efficient and meaningful way without requiring that a user be an expert in the search technology. The present invention further reports the results of a search in an organized fashion and presents the information by categories and illustrates relationships between entries. The present invention also enables a user to extract information from the search results and use those results to refine or create subsequent searches.

Glossary

The following definitions are used throughout this specification to describe a preferred embodiment of the present invention.

API

Application Programming Interface. A set of related functions or classes, packaged in a binary code format, that provides an external interface to a component, layer or service. An API can be distributed, crossing process and machine space. Examples include: Win32 API, DAL API Class A set of objects that share a common structure and a common behavior."

Class Category

A logical collection of classes, some of which are visible to other class categories, and others of which are hidden. The classes in a class category collaborate to provide a set of services.

Client in the Context of an Application

An application or a part of an application that is designated to be a main point of user interaction with the system. It can be an application that is hosted by a Web browser. Examples include: Administration Console, "Librarian User Interaction" client.

Client in the Context of a Consumer of Functionality

A term indicating any system component that relies on the functionality of another component.

Component

A set of related functional elements packaged in some way that allows the elements to be treated as a unit. A component may have one or more classes. A component can be dependent on some external technology to be accessible, such as COM or Java. A component can be reused in multiple parts of a system, in more than one application. Examples include: Rating applet, Application services components, Housekeeping component.

Document

Also known as an object. A document is one or more logical units of information or information streams. A document can be anything recorded electronically which contains information. Examples include: text files, word processing files, program files, tables, databases, electronic mailboxes, audio files, video files, movies, still photographs, sound recordings.

Framework

A collection of classes that provide a set of services for a particular domain; a framework thus exports a number of individual classes and mechanisms that clients can use or adapt.

Layer

Represents a major portion of a system that can be treated as a cohesive set of functionality. It is often used to present logical partitions of the system that go across specific application partitions. Often there is no physical representation of such a layer: the code can be in multiple libraries and applications. Layers bring an important architectural abstraction that facilitates common design and implementation patterns. Identifying layers is one of the best ways to document logical partitions of a system. Examples include: DAL (Data Access Layer), Communications Layer—an abstraction, not necessarily physically packaged that way.

Plug-In

A special-purpose component designated to be a mechanism for extending functionality of already deployed system. It is assumed that there is a way to dynamically load and optionally unload plug-ins. It is important to recognize that plug-ins should extend a system through a narrow "channel." Plug-ins have special rules for performing their operations; they are "invoked" at predefined points in the system data flow. Examples include: Cataloging engine plug-in, Delivery driver plug-in.

Protocol

A set of rules for exchanging information among elements of a system.

Protocol In the Context of Architectural Documents

A way to connect system elements in a distributed environment, for example, when crossing thread, process, computer, platform, or LAN boundaries. Examples include: HTTP, RMI, COM/DCOM, View Manager Protocol (binary data exchange on top of HTTP).

Protocol In the Context of Design Documents

When designing a class, a protocol can be a set of standard methods that a class supports. This is often, though not always, enforced via abstract classes and interface definitions. A protocol can also include a set of patterns or guidelines for adding new methods. This helps the designer omit unnecessary information from the design documentation, simply by specifying that "class A supports protocol B." A class can support several protocols (for example, an update protocol and enumeration protocol).

Example

DAL Entity. Every DAL Entity supports standard DAL Entity protocol which includes lookups by unique identifiers, when the identifiers can be different for different entities. There is a specific guideline for calling such methods as FindByZZZ(. . .), where is such identifier.

Service

A logical and often physical set of related functionality that satisfies one or more conditions:

It identifies an API or a protocol as a primary (but not the only) access mechanism for a client (that is, a consumer of functionality).

It represents or contains an active component (that is, a separate thread of execution or a process).

Its execution can be dynamically configured to gather generic or specific execution statistics. For example, the commands Start, Stop, and Pause; the statistics Time Running and Documents Processed; and other options, such as loading on startup automatically, manually, and so on.

It requires special synchronization, such as shared access, multiple coordinated instances, and so on.

Examples include: Cataloging Service, KB Service.

Tool or Utility

An application or part of an application that is not normally accessible to a wide user audience, but rather to a designated group of specially trained users. Examples include: Administration application, Print Profile utility.

Hardware Environment

FIG. 1 shows a computer hardware environment that could be used with the present invention. The present invention is typically implemented using a computer 100, wherein the computer 100 comprises a processor 106, random access memory (RAM) 130, and read-only memory (ROM) and/or other components. The computer 100 may be coupled to I/O devices, such as a monitor 102, keyboard 108, mouse device 110, fixed and/or removable data storage devices 112 and 114, and printer 118. The computer 100 could also be coupled to other I/O devices, including a local area network (LAN) or wide area network (WAN) via interface cable 120. Those of ordinary skill in the art will recognize that any combination of the above components, or any number of different components, peripherals, and other devices, may be used with the computer 100.

Generally, the computer 100 operates under control of an operating system 122, which is represented by the display 104 on the monitor 102. The present invention is preferably implemented using one or more computer programs or applications 124, which are represented by the window displayed on the monitor 102 operating under the control of the operating system 122. The operating system 122 and computer program 124 are loaded from a data storage devices 112 and/or 114 into the memory 130 of the computer 100 for use during actual operations.

In the preferred embodiment of the present invention, the operating system 122 and the computer program 124 are useably embodied in a computer-readable medium, e.g., data storage devices 112 and/or 114 which could include one or more fixed or removable data storage devices, such as a floppy disk drive, hard drive, CD-ROM drive, tape drive, etc. Further, the operating system 122 and the computer program 124 are comprised of instructions which, when read and executed by the computer 100, causes the computer 100 to perform the steps necessary to implement and/or use the present invention. Those of ordinary skill in the art will recognize that many modifications may be made to this configuration, including the number, size, and types of components, without departing from the scope of the present invention.

User Interface Environment

The present invention provides an efficient way to search and display information from an information retrieval system such as the Internet. The computer 100 robotically builds a semantic model of information contained on the information retrieval system. The semantic model is stored as metadata in an intermediate format on the computer system. Metadata is defined as information about information. For example, the metadata of an expense report might include the date the report was submitted, the date the report was approved, the total amount of the expenses, etc. Metadata can be generated manually or automatically. The intermediate format, or card catalog, provides information in a standardized format. The computer 100 performs a semantic analysis on the metadata and generates search results in response to user actions such as forming a data query, opening or editing electronic files, accessing a database, or reading electronic mail. It will be recognized by one of ordinary skill in the art that the present invention may be used with a variety of different metadata formats and data types without loss of generality.

Figure 2:
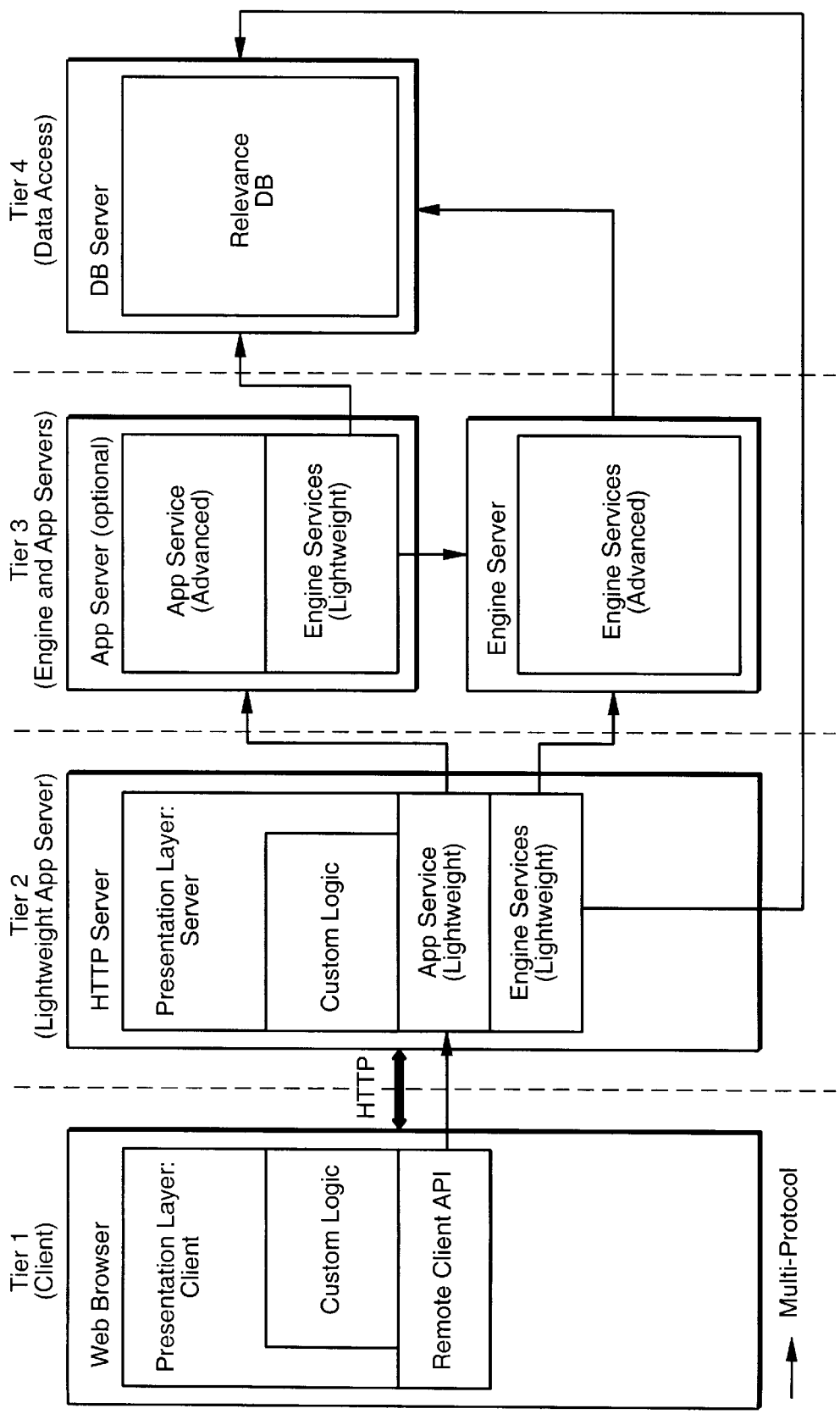
FIG. 2 is a system diagram of a web browser based client compatible with the present invention.
Figure 3:
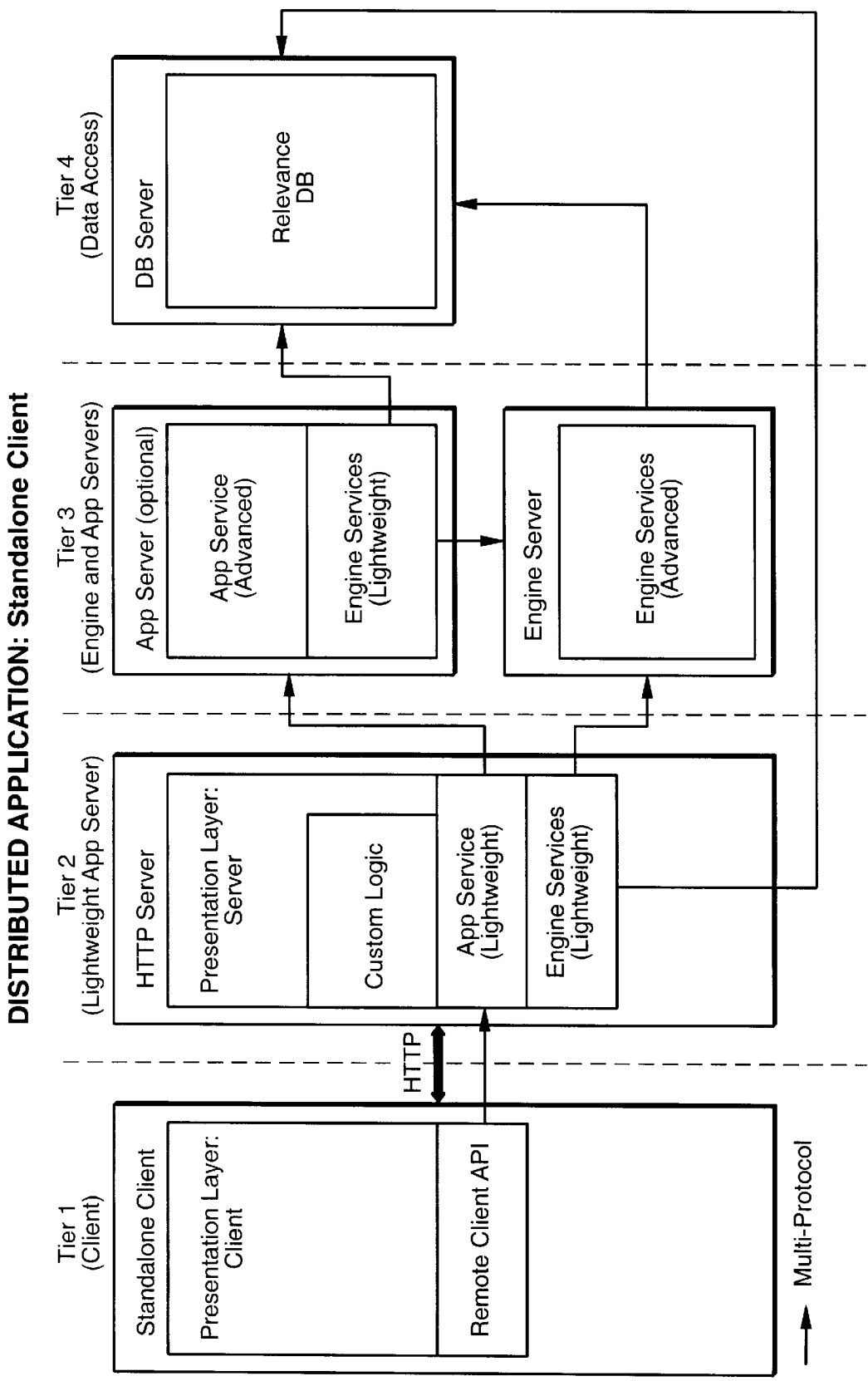
FIG. 3 is a system diagram of a standalone client compatible with the present invention.

Preferred client architectures are shown in FIG. 2 and FIG. 3. In Tier 1, a web browser or standalone client uses a presentation layer and a remote client API to communicate, typically in HTTP, with an application server in Tier 2. The Tier 2 application service communicates with an advanced application service and lightweight engine server of a Tier 3 application server, and the engine services of Tier 2 communicates with the advanced engine services of Tier 3. Both lightweight and advanced engine services of Tier 3 then communicate with a database server of Tier 4.

Figure 4:
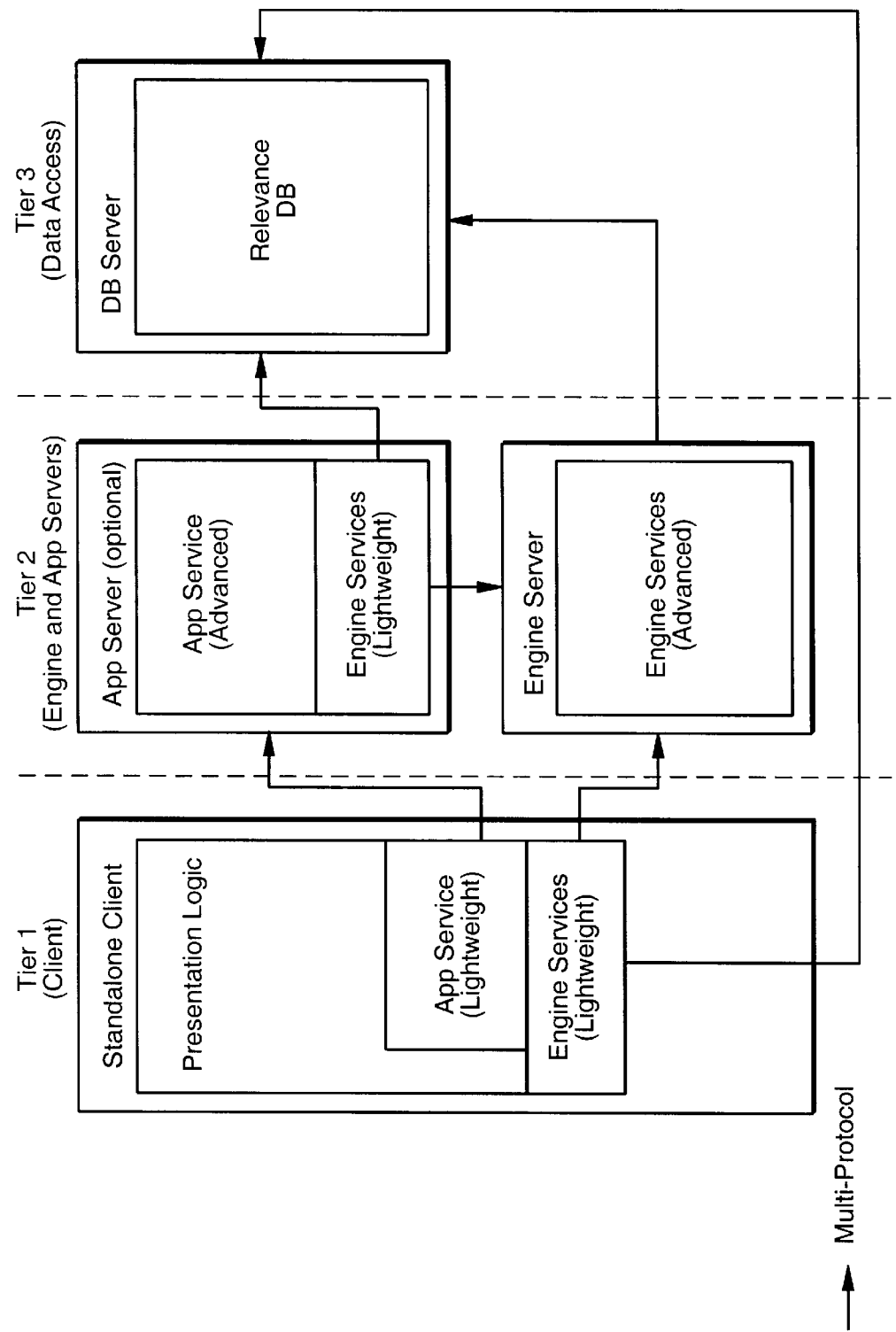
FIG. 4 is a system diagram of a direct client compatible with the present invention.

A preferred direct client architecture is shown in FIG. 4. In Tier 1, a standalone client uses a lightweight application service and lightweight engine server to communicate with an advanced application service and advanced engine service of Tier 2. Both lightweight and advanced engine services of Tier 2 then communicate with a database server of Tier 3.

For FIGS. 2–4, a vertical dashed line represents a tier boundary, and is normally also a process boundary. An exception is performance optimization, with direct access to next tier services. Different tiers can be located on different machines often with different platforms. A rectangle represents a logical set of functionality. It can be packaged into libraries, DLLs, Applications, Components, etc. A thin arrow represents a (normally) cross-process call through a special API and/or a Protocol. The usage should preferably be tracked from top to bottom and from left to right. It includes blocks with shared boundaries.

Figure 5:
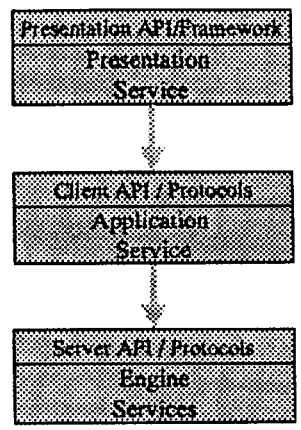
FIG. 5 is a system diagram of a digital library structure compatible with the present invention.
Figure 6:
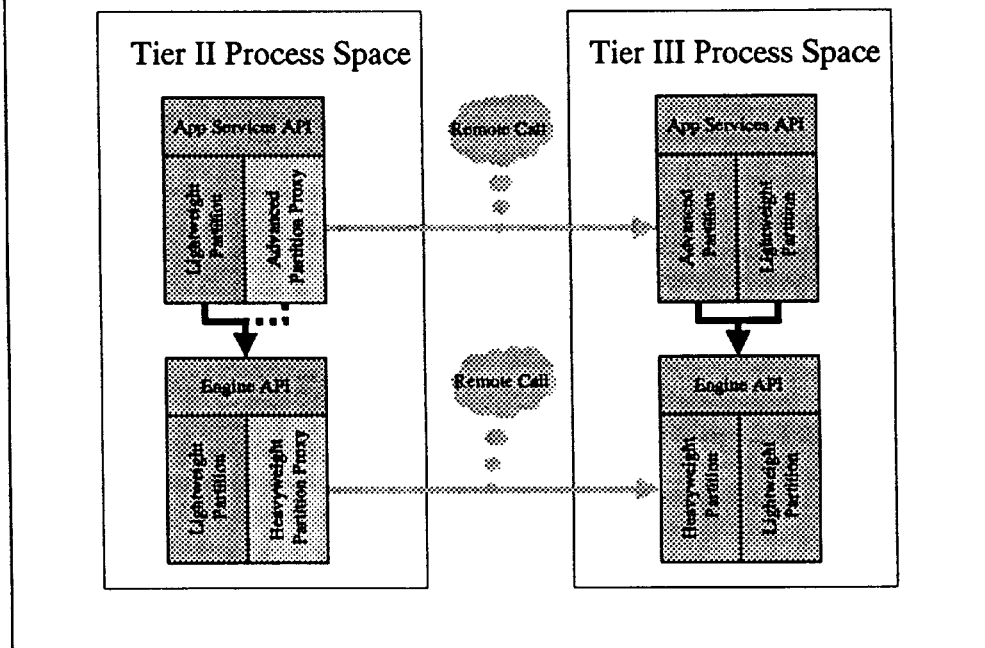
FIG. 6 is a system diagram of public APIs compatible with the present invention.

A preferred digital library structure is shown in FIG. 5. A presentation service using a presentation API communicates with an application service through a client API and protocols. The application service communicates with an engine service through a server API and protocols. The presentation APIs, shown in FIG. 6 and FIG. 7, allow building user experience. They serve as an adapter between a client and the client API. For example, in the case of a DHTML based client, the presentation API simplifies a process of formatting information that is retrieved from the client API into HTML tags. It consists of helper objects that convert data in the client API format into requested format (HTML, XML, Proprietary). The requested format can be specified as an external script. The client API serves the needs of GUI based application. It unifies data structures, introduced the data view metaphor with paging (breaking a large result set into multiple pages), simple actions and sessions. The server API allows building the client API, tools and server extensions, like plug-ins and event listeners.

Figure 7:
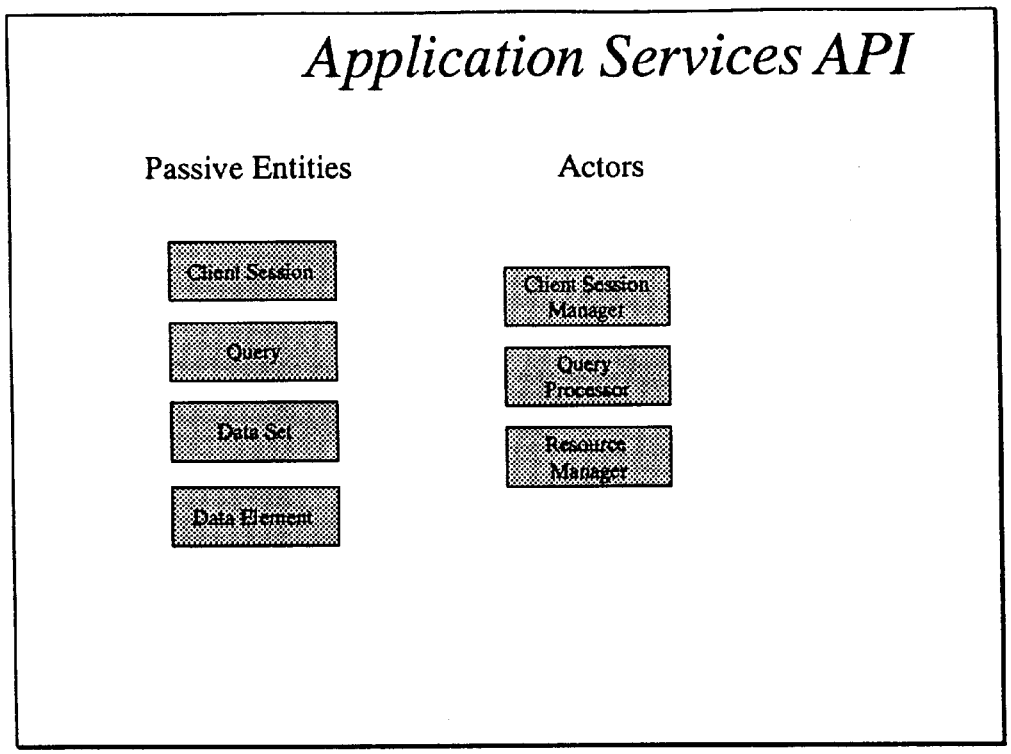
FIG. 7 is a system diagram of an application services API compatible with the present invention.
Figure 8:
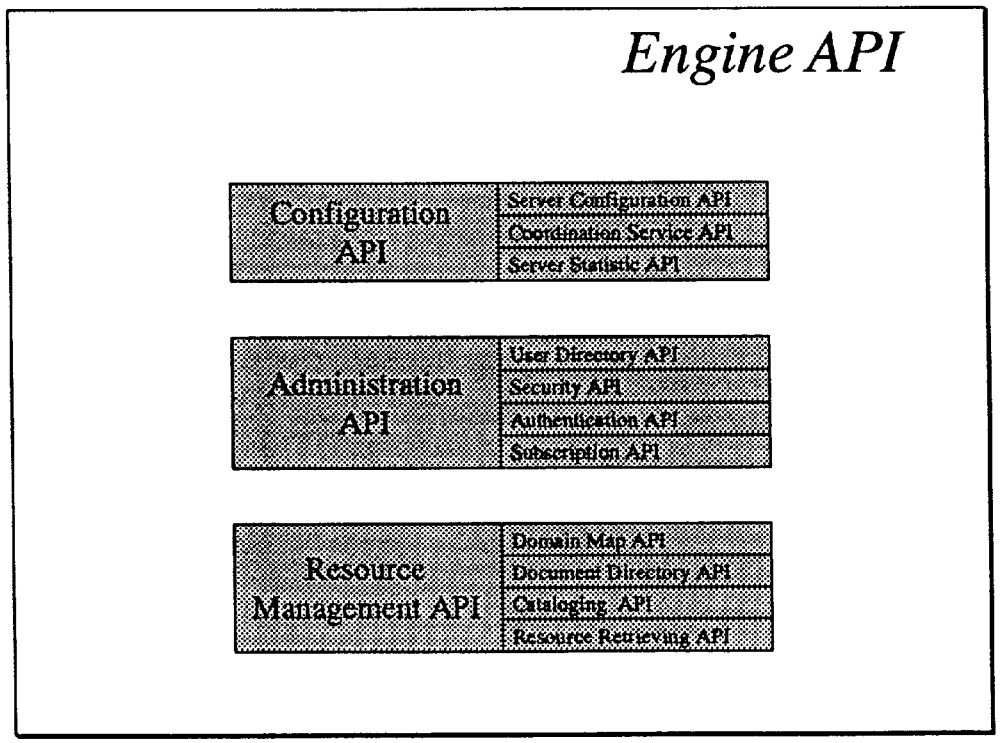
FIG. 8 is a system diagram of an engine API compatible with the present invention.

The client session shown in FIG. 7 allows the system to identify active users and attach information with the session life cycle. The client session manager, using the authentication server API, preferably generates client sessions. An important part of the client session manager is session collection, which results in the collection of a data set. The data set is a virtual container with data elements, and allows the system to break a large set of data into multiple pages and "keep" a result set between requests. A data element is an interface that provides a unified way to retrieve resource properties:

String Get (String strPropertyld);

A data element allows the system to simplify a presentation layer, because it easy scriptable. The associations between the APIs described above are shown in FIG. 8.

Figure 9:
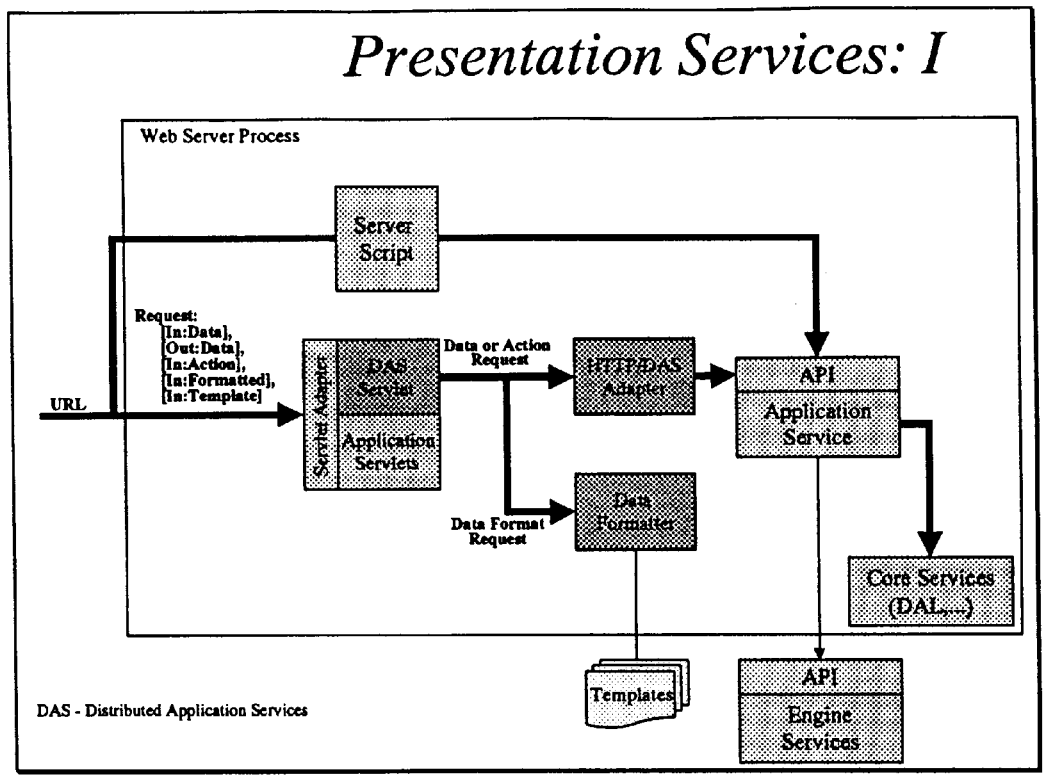
FIG. 9 is a system diagram of presentation services and generic data formatting compatible with the present invention.

A typical presentation service and generic data formatting process is shown in FIG. 9. A uniform resource locator (URL) is received by a server script and a servlet adapter having a DAS servlet and application servlets. A data or action request is then sent to a HTTP/DAS adapter, and a data format request is sent to a data formatter. The HTTP/DAS adapter and the server script then communicate with an API application service, which in turn communicates with core services and the API engine services.

Figure 10:
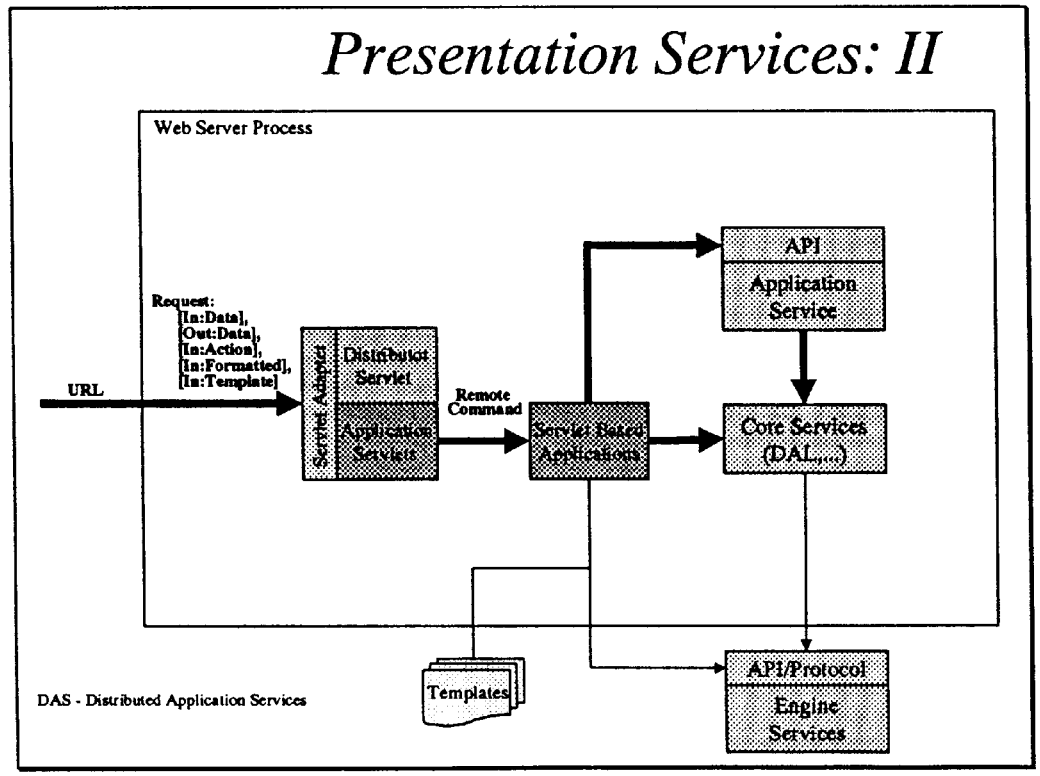
FIG. 10 is a system diagram of presentation services and proprietary data formatting compatible with the present invention.

A typical presentation service and proprietary data formatting process is shown in FIG. 10. A uniform resource locator (URL) is received by a servlet adapter having a distributor servlet and application servlets. A remote command is sent to server based applications, which communicates with an API application service, core services and the API engine services.

Figure 11:
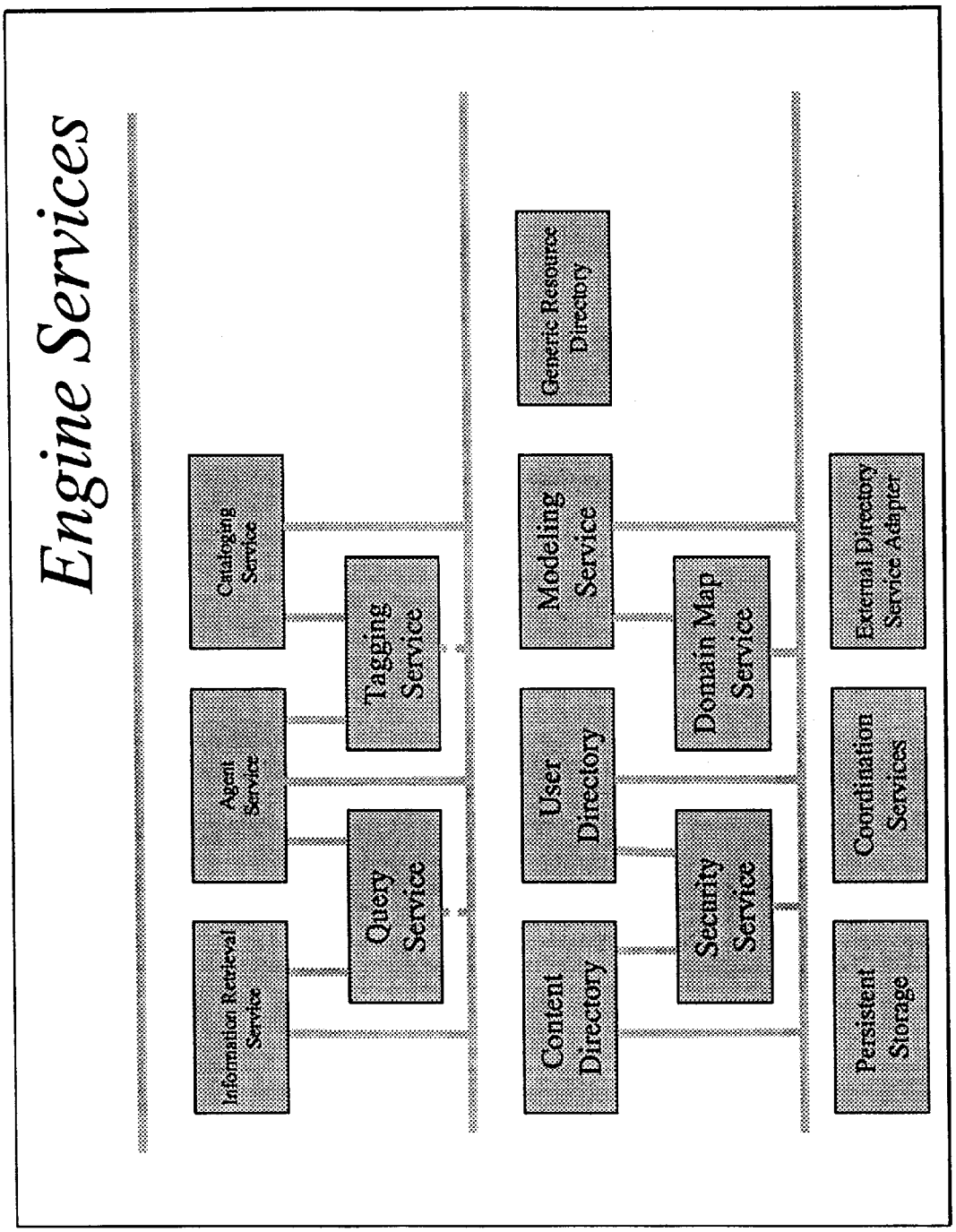
FIG. 11 is a system diagram of engine services compatible with the present invention.

Preferred engine services are shown in FIG. 11. DAL provides object oriented interface for persistent storage. DAL encapsulates some business logic about stored entities such as ID generation, setting default values for some properties, access synchronization and etc. A preferred embodiment uses C++ implementation (on the top of GDA) and provides a Java bridge using LDL.

Coordination services are glue between rest services. It provides event and queue based coordination mechanism, scheduling and ability to introduce plug-ins that works inside and outside Librarian process space transparently.

External directory service adapter provides a generic approach to access external directory services (NDI, LDAP, X500, etc.). The external directory service adapter component defines a SPI like interface to the server. It allows the plug-in of different external directories transparently to the server. It also serves as a facade for multiple directory services.

The security service provides a way to enforce different security polices. Every operation such as updating librarian data or retrieving particular peace of information validates a request against the security Manager.

The DM service is typically a facade on the top of the KB partition of the DAL. It provides caching, synchronization and higher abstractions over DAL. It is responsible for concept recognition. As input it accepts "raw text" or special format text with metadata, and returns a raw conceptual header.

The content directory usually provides a unified way to register documents in the librarian and store document properties and models.

The user directory typically provides a unified way to register users in the librarian. It responsible for synchronization with external directory services (NDS, LDAP).

The modeling service typically encapsulates the process of building resource models and conceptual matching.

The query service is responsible for process a query against bunch of resource models. It typically has no knowledge where this query comes from.

The tagging service processes a resource model against several queries. During initialization services above, it supply a set of queries. Potentially, the tagging service may cache different items, such as taxonomy node rules or active subscribers queries.

The information retrieval service typically utilizes the query service to perform a query against librarian resources from one side, and from another side it is bridge to external Search Services.

The agent service is responsible for managing agents or active stored queries. For optimization, it can use batch processes through the tagging service for active subscriptions, and the query service for less active subscription.

The cataloging service is a high level service which models and organizes resources during submission.

Figure 12:
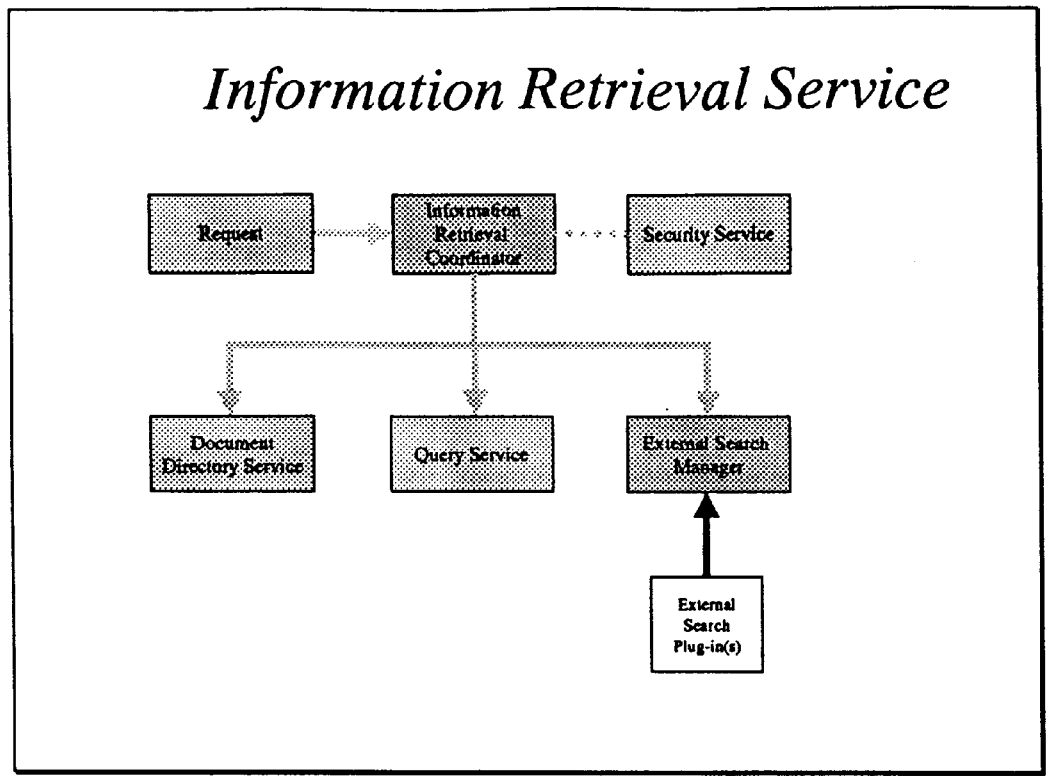
FIG. 12 is a system diagram of an information retrieval service compatible with the present invention.
Figure 13:
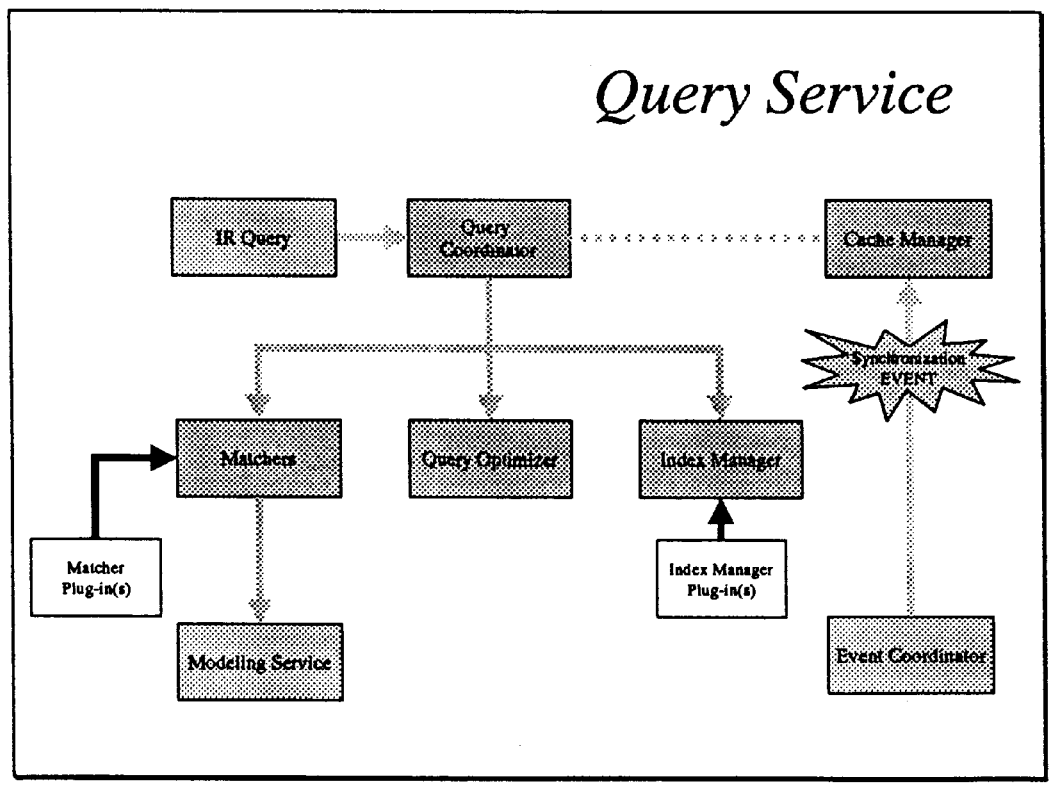
FIG. 13 is a system diagram of a query service compatible with the present invention.

A preferred system diagram of an information retrieval service and a query service are shown in FIG. 12 and FIG. 13. The IR Query consists of expression on the top of resource properties, mined concepts and conceptual profiles. All parts in the IR Query are optional. The IR Query may specify extra parameters such as sorting order, required resource types (only users, all resources). The Query Service is responsible for resolving security. The information retrieval service filters out all forbidden resources. The Query Service uses internally preferably third party indexing technologies such as Fulcrum and Verity. The Query Service is responsible for query optimization, and attempts to find a best way to resolve a request. The Query Service may maintain several indexes for different kinds of resources such as content, users, and generic resources, or one global index across all resources.

All resources are preferably divided into active resources and archive. All active resources are cached in the indexing server and in the persistent storage all resource properties and mined concepts are stored in the system. The archive resources are not cached in the RAM and instead, a query is performed against persistent storage. All properties and mined concepts for archived resources are stored in a format which may be queried. The assignment of resources to the active pool and to archive is an optimization process. It is dictated by available hardware. The Query Services handles this issue transparently for users.

The IR Query has scope parameter which is to perform a query against active resources, archive or all. It maybe important from user interaction stand point.

The Query Service may reject sorting attribute if a third party indexing server does not support sorting or the Query Service does not have enough information. In this case the information retrieval service will sort result set. From a performance stand point this can be very beneficial.

One of the configuration parameters for Query Service is maximum number of resources in the result set. The server can also run multiple instances of the Query Service on different CPUs. The Query Service also provides a remote access interface.

Figure 14:
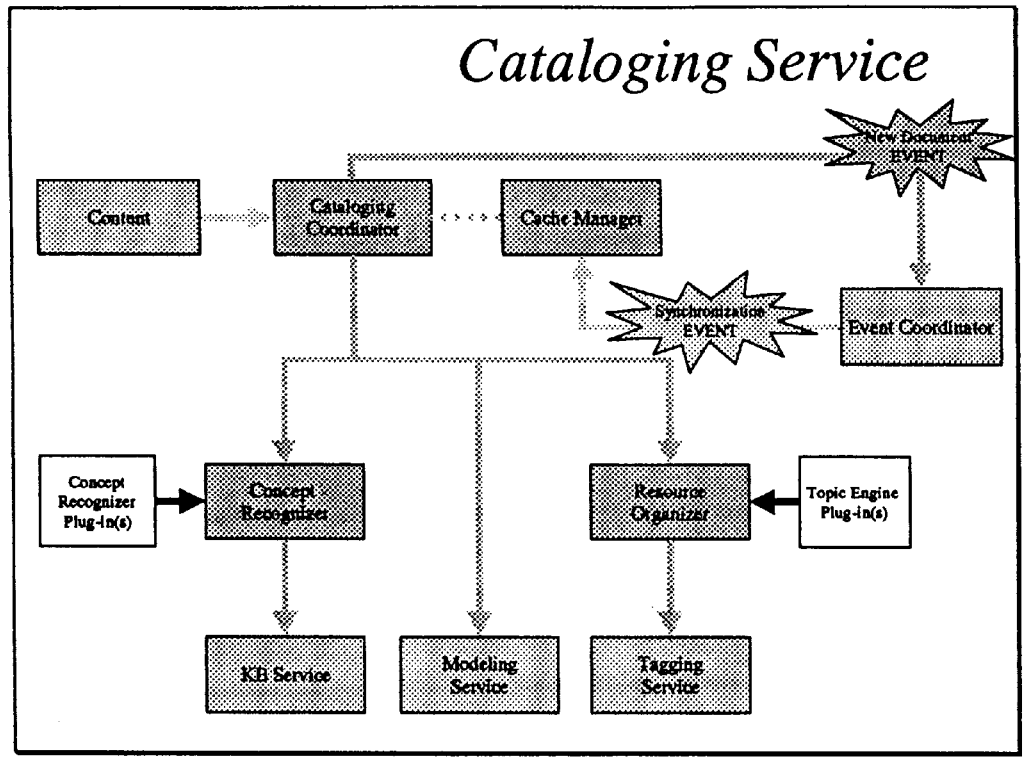
FIG. 14 is a system diagram of a cataloging service compatible with the present invention.

A preferred cataloging service is shown in FIG. 14. The modeling service provides different functionality groups and has the ability to have multiple instances across different CPUs. The modeling service exposes itself for remote access, hides the internal working of the conceptual headers and conceptual profiles, and supports the conceptual headers and conceptual profiles. Different models preferably store the DM version identifier. The DM service is preferably used for internal needs and DAL to store models.

Figure 15:
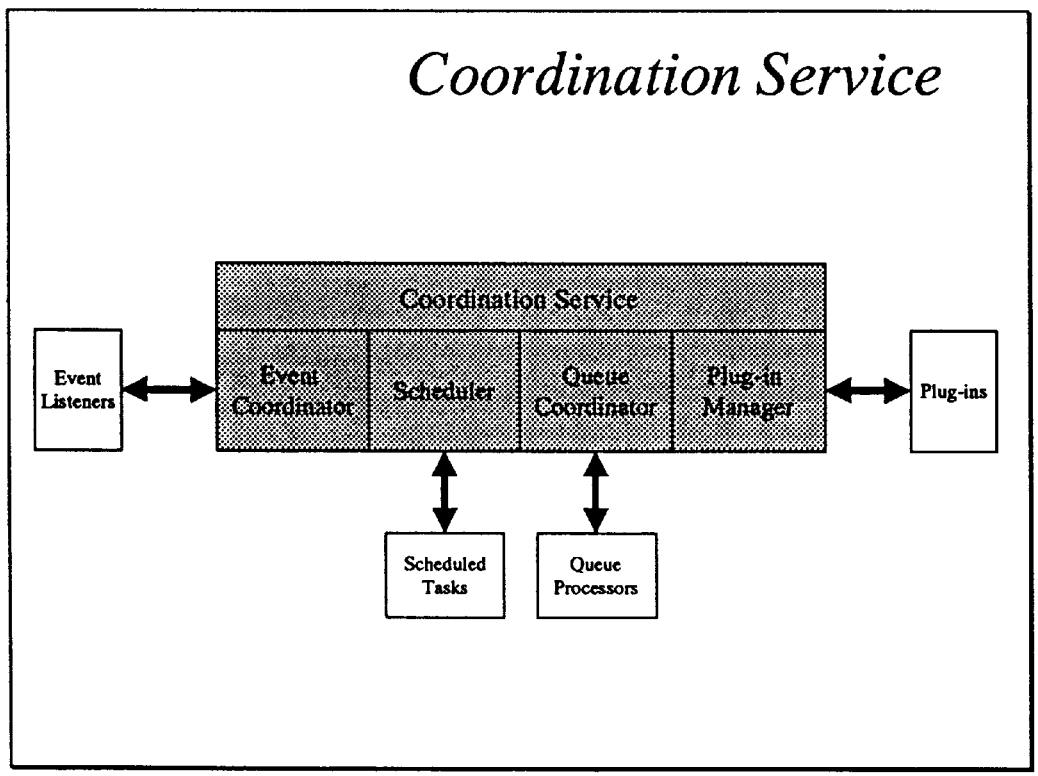
FIG. 15 is a system diagram of a coordination service compatible with the present invention.

A preferred coordination service is shown in FIG. 15. The coordinating service typically consists of four major components:

1. Plug-in management.
   Provides generic approach to register a plug-in.
   Allows having multiple plug-ins in the same control point (invoking order maybe important).
   Load and unload plug-ins.
   Enumerates known plug-ins.
   Transparently supports plug-ins that run in the same process space with Server or outside of the Server process space.
   Supports remote plug-ins.
2. Event management.
   Supports synchronous event raising (Send Event but not Post Event).
   Event mechanism is mostly for notification and synchronization, but it is not RPC mechanism.
   Provides a generic mechanism to register events.
   Provides a generic mechanism to register event listeners (with filters).
   Supports multiple listeners for the same event (no priorities between listeners).
   Allows having listeners from the same process space and outside of the process space where an event was raised.
   Allows having remote event listeners.
   Does not loose raised events when system crashed.
   Provide debugging features (for example, logging event listeners).
3. Schedule task management.
   Provides a generic mechanism to register schedule task.
   Allows having schedule task on any computer that runs on the Server.
   Allows having remote schedule tasks.
   Supports task priorities. active tasks across system.
4. Queue management.
   Well-known queue management components may be used.

Figure 16:
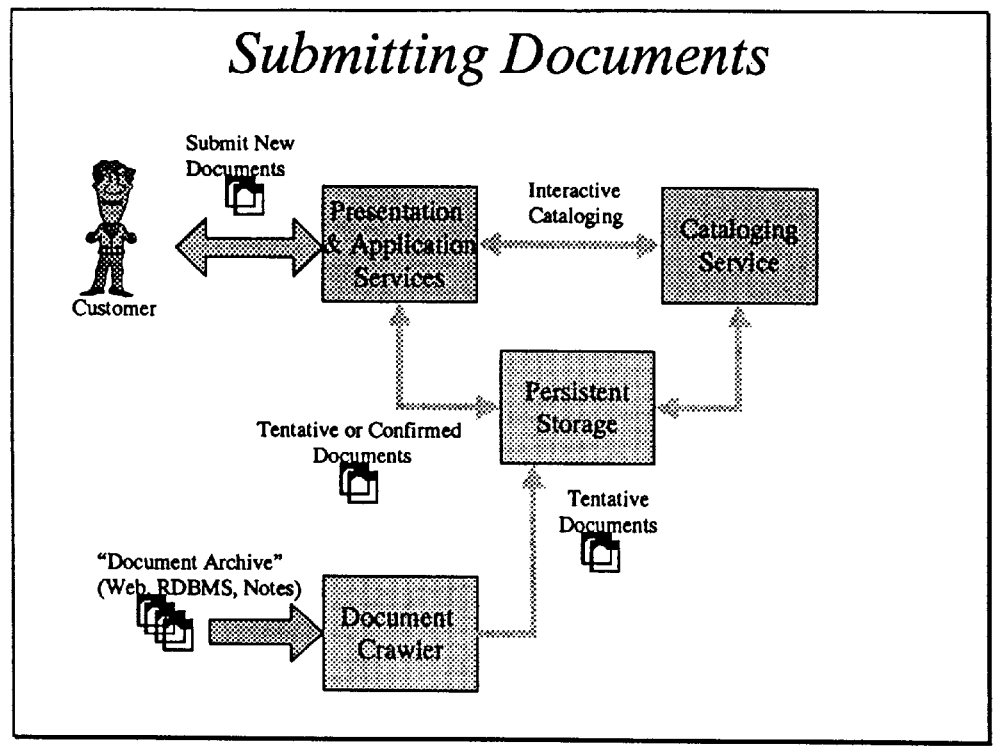
FIG. 16 is a data flow diagram for submitting documents compatible with the present invention.
Figure 17:
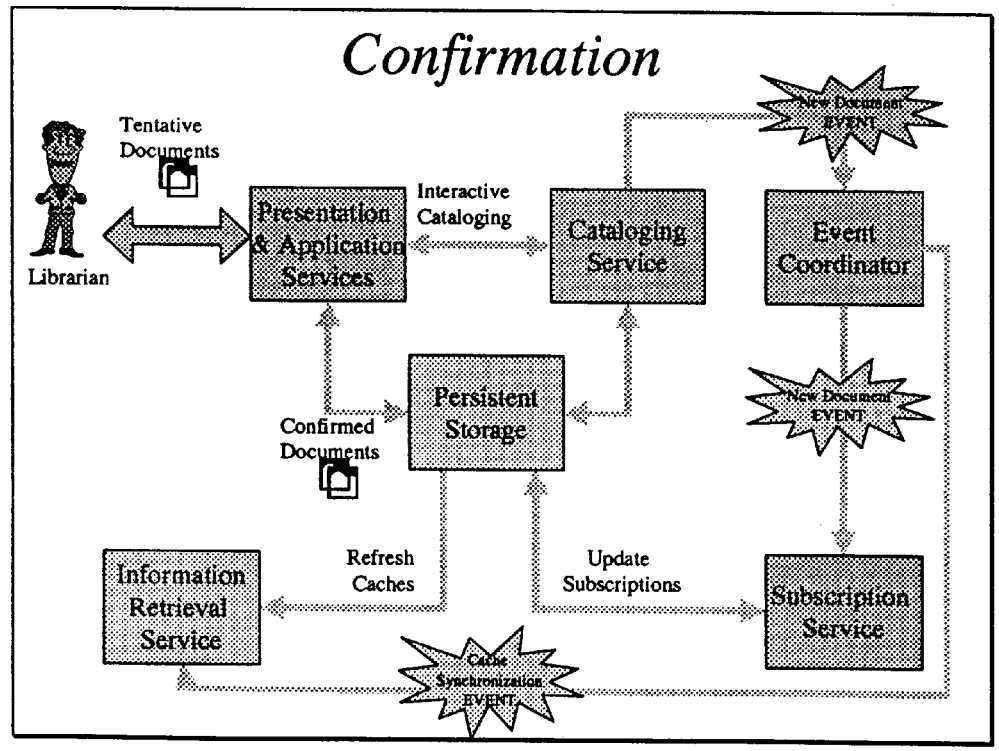
FIG. 17 is a data flow diagram for receiving a confirmation compatible with the present invention.
Figure 18:
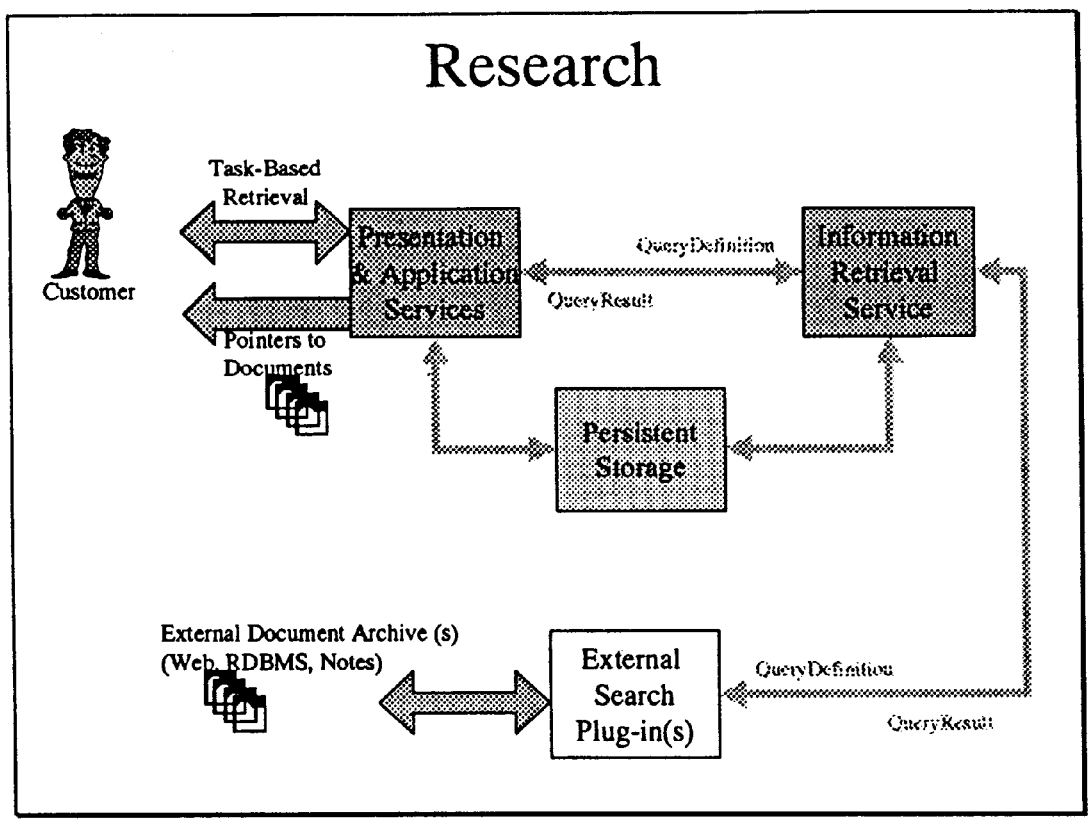
FIG. 18 is a data flow diagram for researching compatible with the present invention.

Preferred examples of a method of submitting documents, receiving a confirmation, and submitting a research request are shown in FIGS. 16–18.

Figure 19:
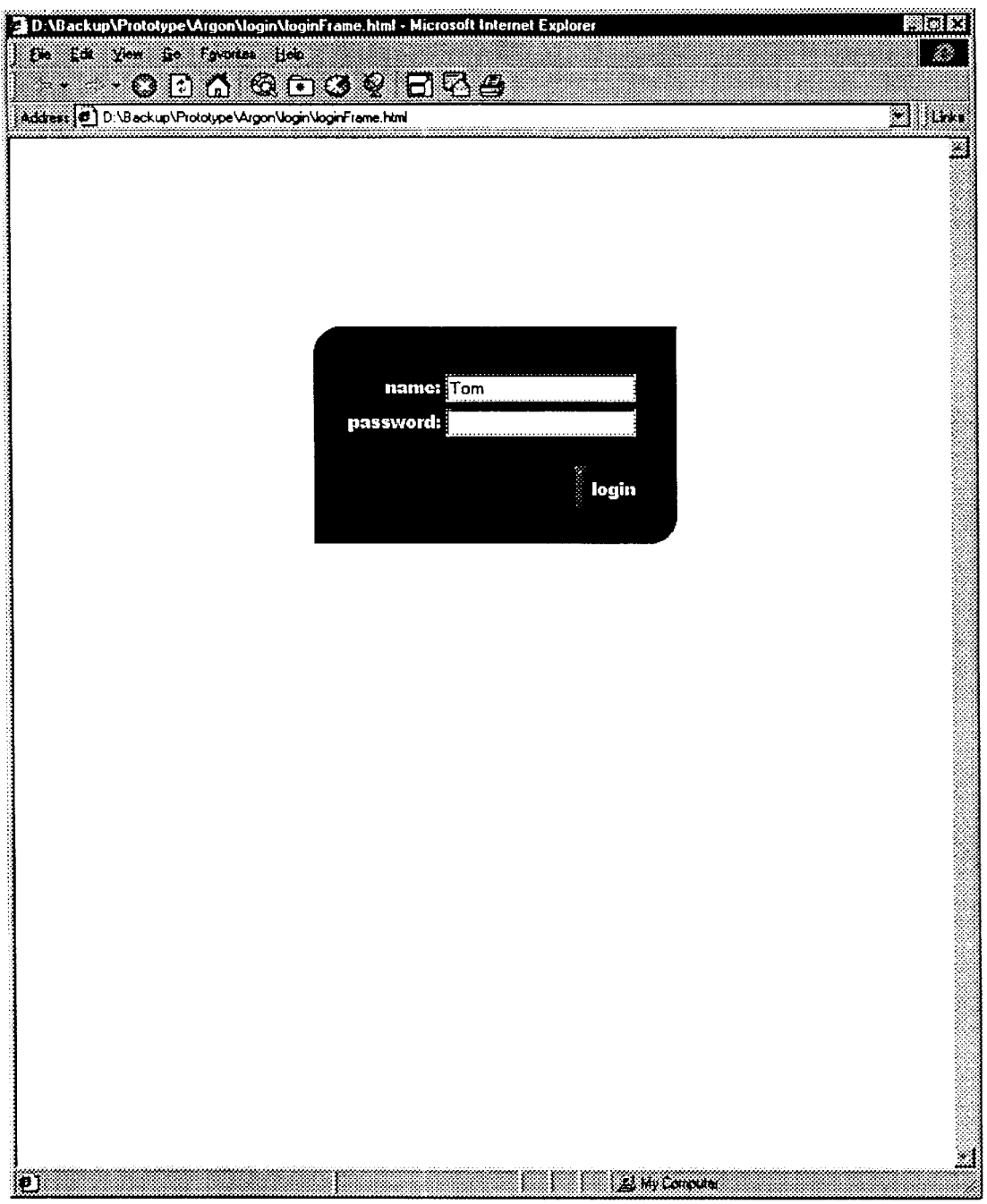
FIG. 19 is a screen display of a login window compatible with the present invention.
Figure 20:
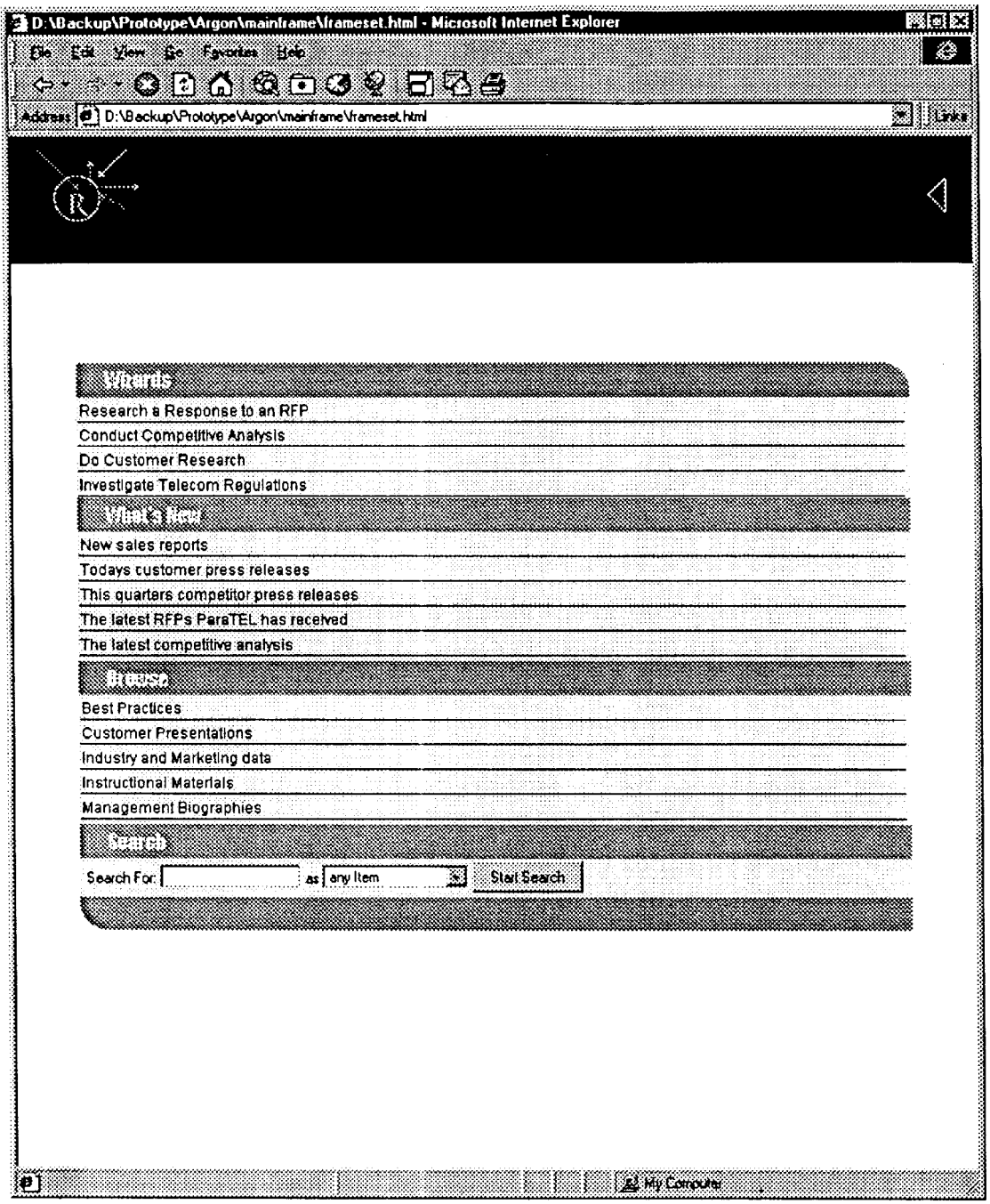
FIG. 20 is a screen display of a search request window and prompt compatible with the present invention.

A preferred GUI login window is shown in FIG. 19. A user is optionally prompted for a name and password as, a way of identifying the user to the system. A user may alternatively be automatically logged into the system, or be a member of a generic user class which does not require a login. Each user in the system is a member of a group or class. All members of the same user class initially share the same display attributes and share the same access to information, but these will change over time with each user's preferences and patterns of activities. Once a user has entered the system, the user is optionally presented with a list of information groups or report categories in a search request window, as shown in FIG. 20, but information may also be displayed in other formats without groups or categories. The information groups are predefined for each user class, but can be changed individually by a user, or changed by a group administrator for all users in the user class. The number of information groups is not limited. The search request window includes a prompt which enables a user to enter search text. However, queries can also be formed by other user activities, such as opening or editing electronic files, accessing a database, or reading electronic mail. The text may include boolean operators such as AND, OR, and NOT, and other wildcards and root expanders. A pull-down menu enables modification of the search through the use of semantic properties such as dimension/category or relationship.

Figure 21:
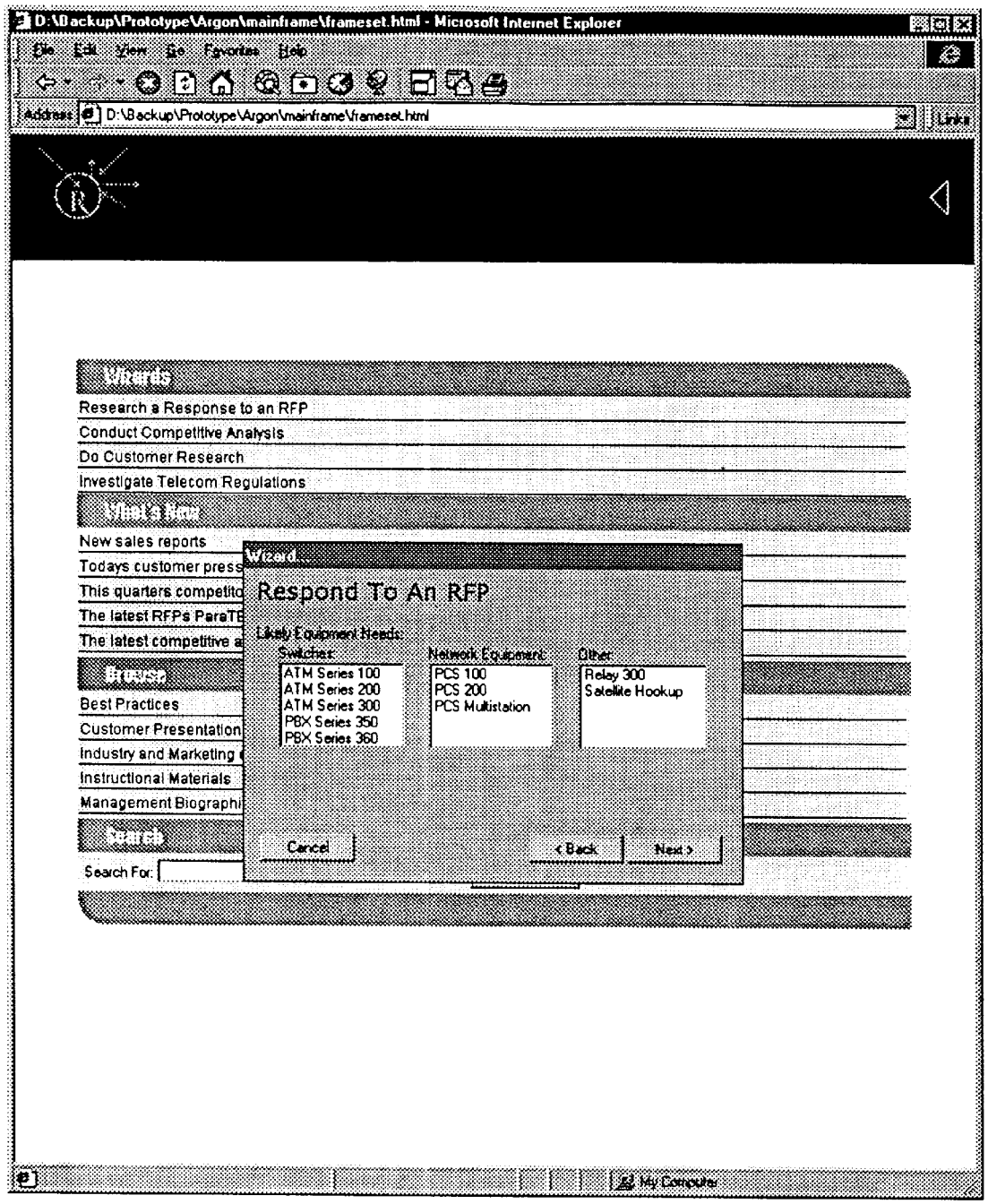
FIG. 21 is a screen display of metadata search results window compatible with the present invention.

The present invention provides a way of presenting automatically generated search results to the user, as shown in FIG. 21. A results or wizards window is associated with one or more information groups as part of the semantic model of a user action. A wizard is a program or agent which can carry on a query which is invisible to a user in order to obtain information which is displayed to the user. A wizard can also create metadata. The results window obtains various of types of information from the metadata, and in combination with a user search query, displays the specific data as one or more panels in the results window. For example, as shown in FIG. 21, a results window is defined for the first information group entitled "Research a Response to an RFP". The window is titled "Respond To An RFP", and based upon the metadata and a user query, automatically displays three panels entitled "Switches", "Network Equipment", and "Other". The number and length of panels is not limited. Virtual on-screen buttons labeled "<Back" and "Next >" allow a user to page through a large number of panels.

With the present invention, the end result of a wizard is typically the generation of a metadata query. As a user interacts with a wizard, the user's actions alter what is displayed through the wizard script. The wizard script can also interact with metadata which has been generated. The branching of the wizard through the wizard script is determined by user actions, which generate a metadata query, which obtains information from a source, which then enables the wizard to make a decision and branch appropriately in the wizard script.

Figure 22:
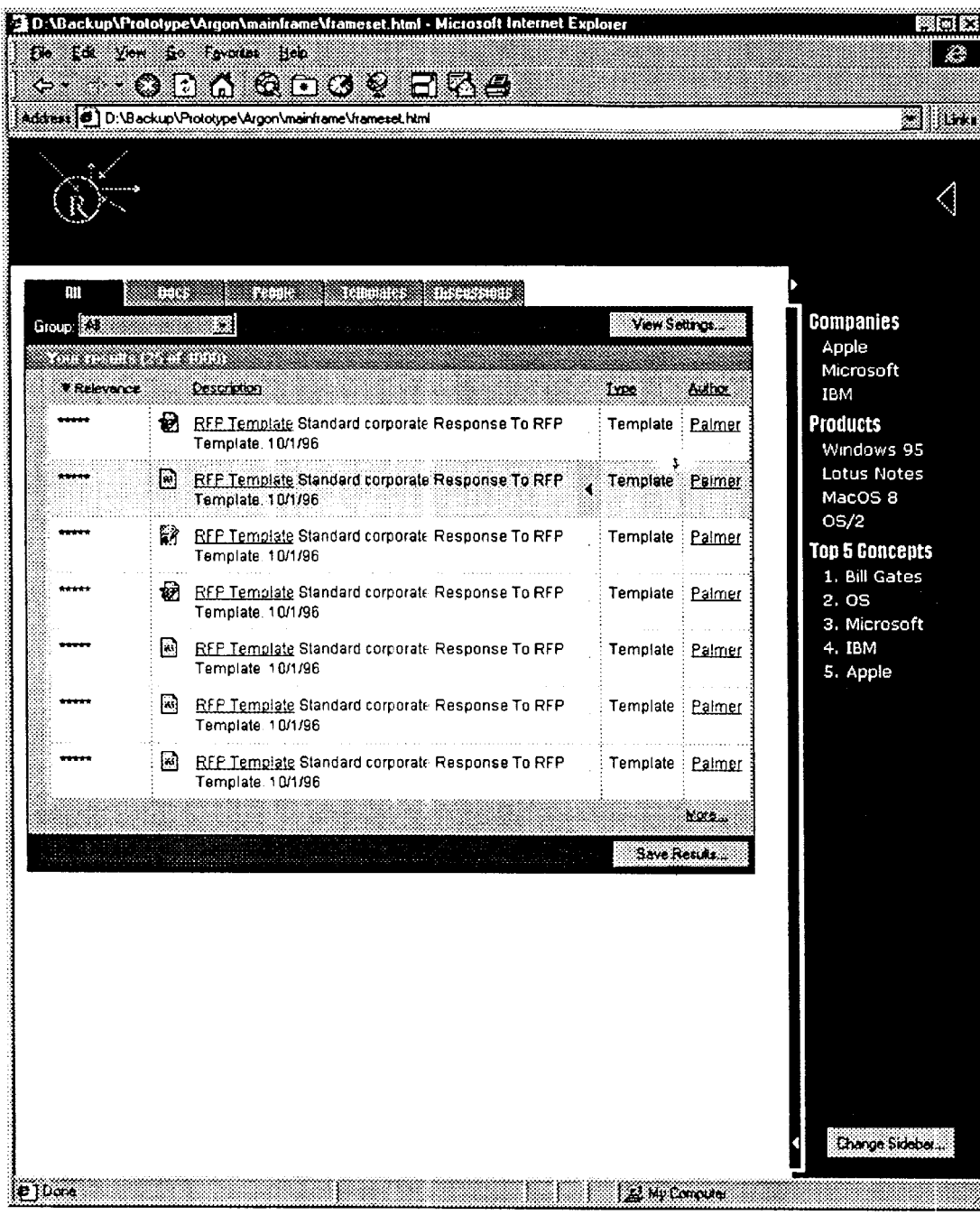
FIG. 22 is a screen display of metadata search results in a sidebar compatible with the present invention.

The process of selecting a resource and seeing dynamic metadata extraction is shown in FIG. 22. A preferred embodiment of the GUI provides for interactively extracting metadata from a user selection and displaying the resulting metadata on screen in a results sidebar. For example, as shown in FIG. 22, a user has selected the second document in the list of documents or set of results. Once the user has selected a document, three categories of information are displayed on the right hand portion of the screen in a results sidebar with the headings "Companies", "Products", and "Top 5 Concepts". The information under each of the headings is updated in real-time as the user selects documents. The categories, information, and depth of hierarchy are all dynamic to the user selection. At least four display modes are possible:
1. No documents are selected by the user, and no results are displayed in the sidebar.
2. One document is selected, and only the metadata for that document is displayed in the sidebar.
3. Multiple documents are selected, and metadata for each document is displayed in the sidebar. The metadata may be integrated for all selected documents.

4. An integrated set of metadata is displayed without regard to selection. Integrated metadata uses the metadata from all of the documents.

Figure 23:
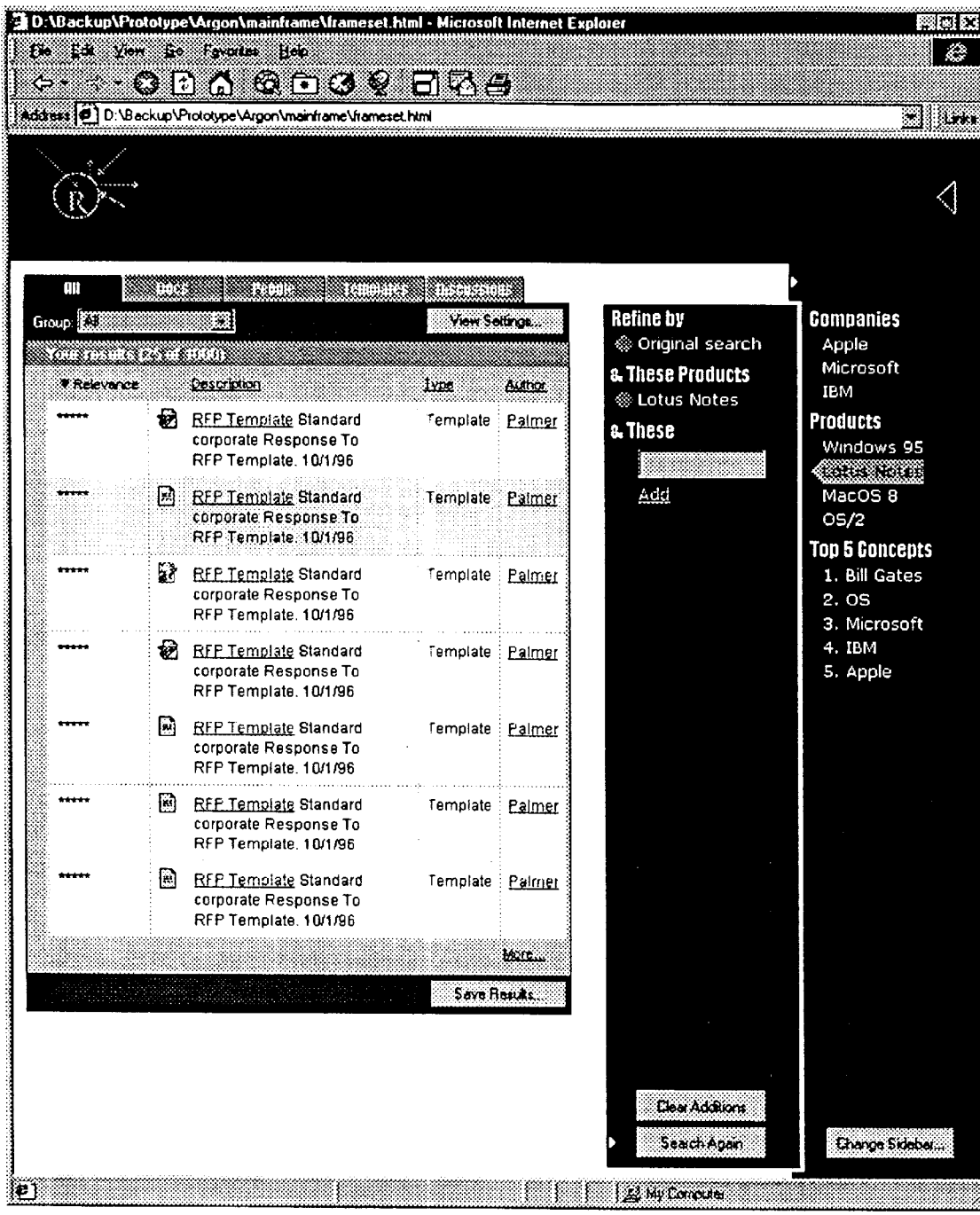
FIG. 23 is a screen display of metadata for inclusion in a query definition compatible with the present invention.

The process of selecting resource metadata and accumulating the metadata into a query definition is shown in FIG. 23. A preferred embodiment of the GUI provides for selecting metadata for inclusion in a query definition. Upon the user selecting a metadata item, the metadata is moved into the query definition area. For example, as shown in FIG. 23, a user has selected "Lotus Notes" from the results sidebar heading "Products". Once the user has selected this metadata, a query modification window displays three headings of "Refine by", "& These Products", and "& These". The user's selection of metadata from the results sidebar, "Lotus Notes", is automatically included under the heading of "& These Products". A virtual on-screen button labeled "Add" allows the user to accept the modification to the search query and perform a new search. It will be recognized by one of ordinary skill in the art that the headings, categories, and documents shown in FIG. 23 are for the purpose of explanation only, and that a wide variety of headings, categories, and documents are possible with the present invention without loss of generality.

The present invention provides for pinning extracted metadata in place to define a query in either batch mode or real time. Query results may be automatically changed in real-time to match the requirement placed on the system in response to the pinning action. A circle, icon, or other virtual button located adjacent to information categories allows a user to pin that information. For example, in FIG. 23, a user might pin the entries "Microsoft" and "Apple" under the "Top 5 Concepts" heading in the results sidebar by selecting the circles located adjacent to those entries. Once pinned, only references which incorporate or relate to either one of the pinned entries are displayed. The display may be changed in real-time as entries are pinned or unpinned. If the results are being displayed in real time, the result list changes upon selection by the user. If the results are being displayed in batch mode, upon selecting another search, all information is updated to the user at once. This is typically more efficient computationally, and less likely to be unnerving to the user.

Figure 24:
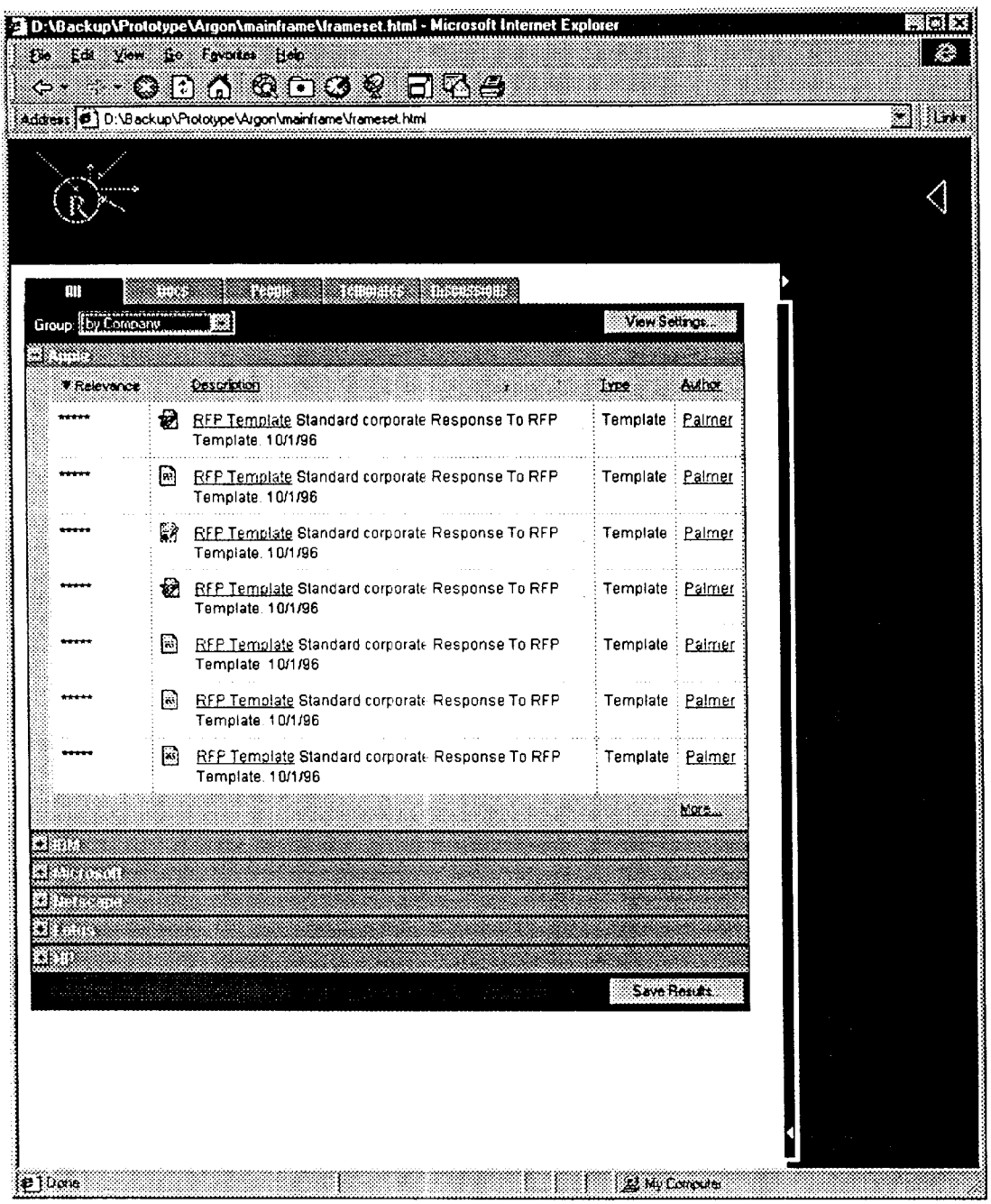
FIG. 24 is a screen display of grouping metadata by types compatible with the present invention.

The process of extracting metadata from a search result set to allow grouping of the results by types of metadata is shown in FIG. 24. The software examines the conceptual metadata relating to an entire set of documents and extracts a list of the common types of metadata that are present in that particular set of documents. For example, as shown in FIG. 24, the system might determine that the results are largely about executives, products, and companies. The GUI presents the user with the option to group the results around specific executives, products or companies. If the user groups the results by companies, the results are presented with one or multiple levels of grouping hierarchy where each top level node in the hierarchy is the name of a specific company, and the leaf nodes are documents that are relevant to the company listed at the top level node. The groups may be predefined by an administrator, chosen by a user, or extracted dynamically.

Figure 25:
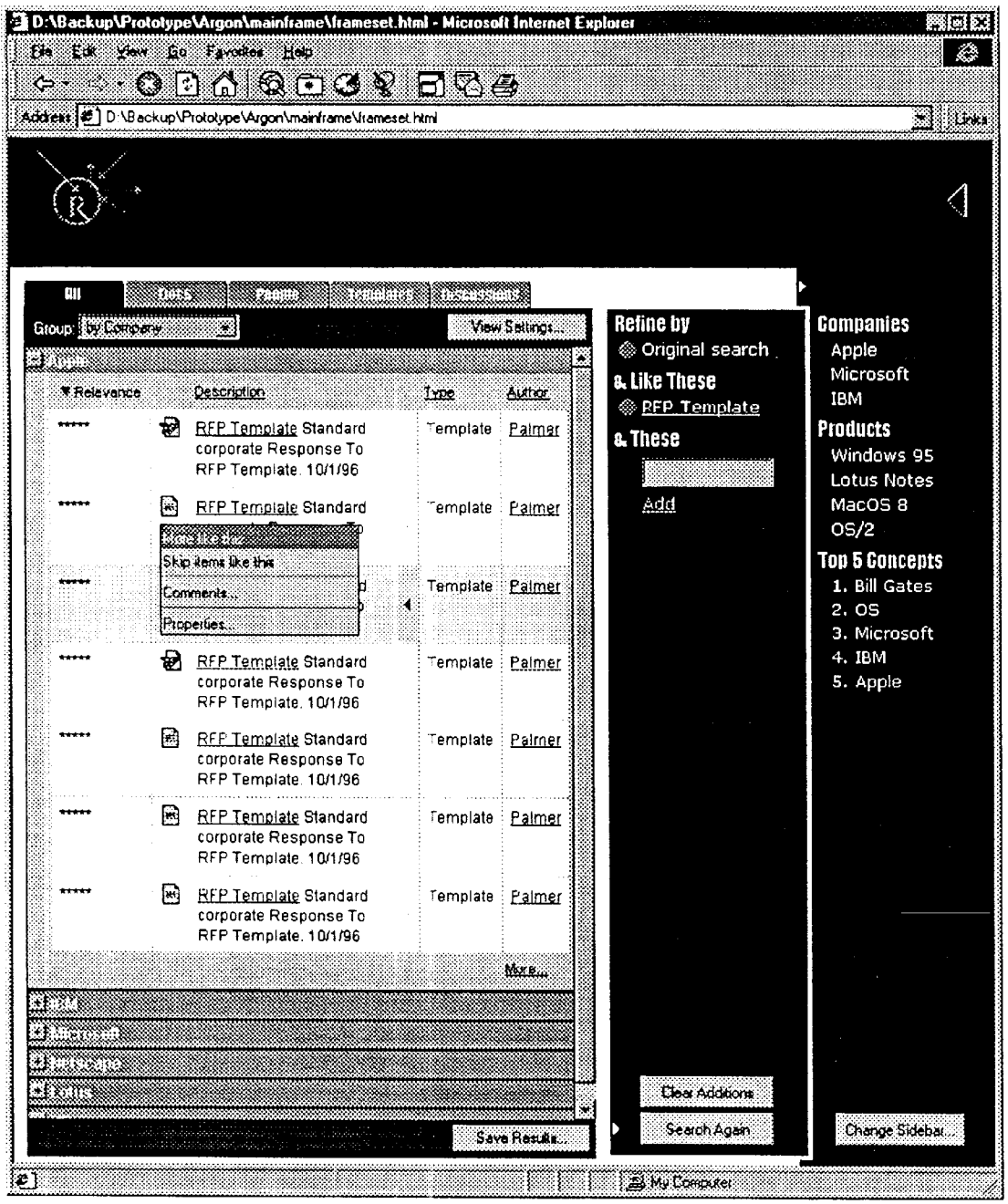
FIG. 25 is a screen display of user preference feedback compatible with the present invention.

The process of visualizing user preference feedback by explicitly drawing it as part of a query definition is shown in FIG. 25. The GUI displays user preference feedback, which typically indicates that the user "likes/doesn't like" a particular document, and the system displays that preference visually to the user. The GUI then provides mechanisms for allowing the user to change their feedback on a particular document at a later time. In a preferred embodiment, a user selects an item of metadata and moves it to a "refine by" panel. The user can then pin or unpin the item to change the user feedback.

Figure 26:
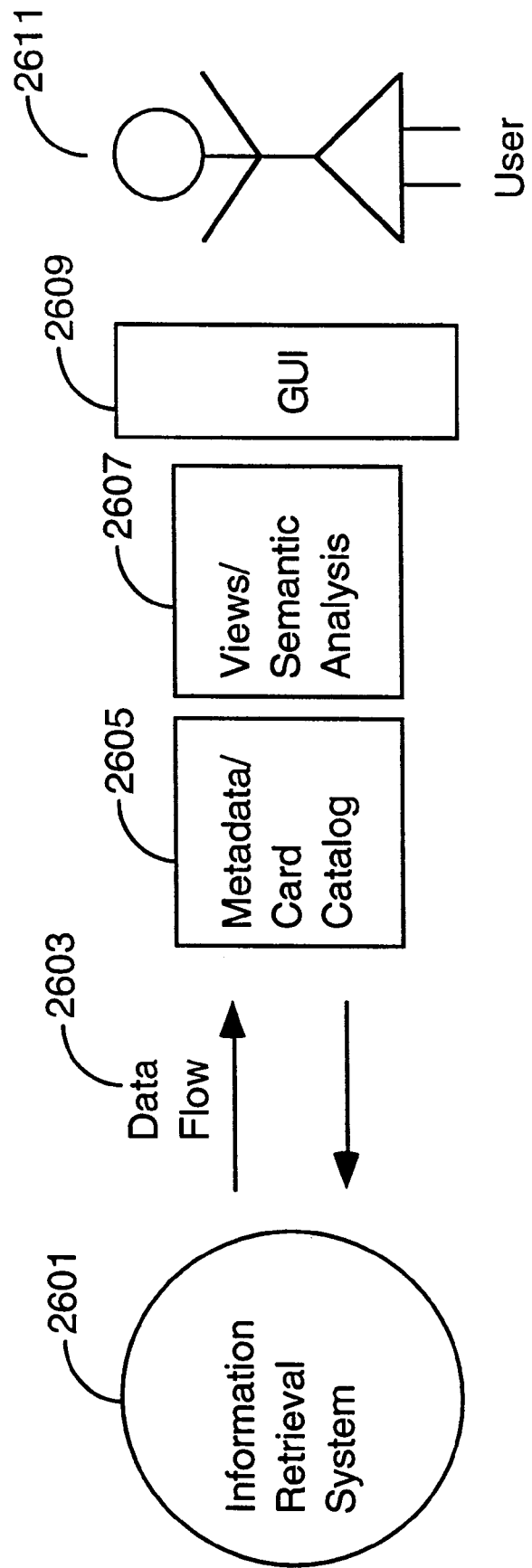
FIG. 26 is a high level system and data flow diagram compatible with the present invention.

A high level system and data flow diagram compatible with the present invention is shown in FIG. 26. The computer 100 reads and writes data 2603 to and from an information retrieval system 2601. The data 2603 is analyzed and metadata 2605 is stored in a card catalog. Semantic analysis 2607 is performed on the metadata 2605, and the results of the analysis are presented to the user 2611 through the GUI 2609.

While the invention is described in terms of preferred embodiments in a specific system environment, those of ordinary skill in the art will recognize that the invention can be practiced, with modification, in other and different hardware and software environments.

What is claimed is:

1. A method of searching, retrieving and presenting information with a computer graphical user interface (GUI) comprising the steps of:

displaying a plurality of information categories for each user according to each user's pattern of interaction with the computer graphical user interface;

displaying a results window associated with one or more information categories;

displaying panels inside the results window based upon metadata and a user query;

enabling a user to page through panels by using virtual buttons;

performing a query by conducting a semantic analysis on metadata representing a semantic model of information on an information retrieval system;

dynamically extracting features of the underlying information from user-selected results and displaying the results grouped by categories of features of the underlying information.

2. The method of claim 1 further comprising the step of performing the query against active resources.

3. The method of claim 1 further comprising the step of performing the query against archived resources.

4. The method of claim 1, wherein the step of performing the semantic analysis on the on the metadata includes the substeps of:

relating resource metadata, and accumulating the selected resource metadata into a query.

5. The method of claim 1 comprising allowing pinning of extracted metadata displayed on a screen to define a query in either batch mode or real time.

6. A program storage device readable by a machine, comprising a program of executable instructions performing method steps for multi-dimensional analysis of objects by manipulating discovered semantic properties, said steps comprising:

displaying a plurality of information categories for each user according to each user's pattern of interaction with the computer graphical user interface;

displaying a results window associated with one or information categories;

displaying panels inside the results window based upon metadata and a user query;

enabling a user to page through panels by using virtual buttons;

performing a query by conducting a semantic analysis on metadata representing a semantic model of information on an information retrieval system;

dynamically extracting features of the underlying information from user-selected results and displaying the results grouped by categories of features of the underlying information.

7. The device of claim 6 comprising executable instructions performing the query against active resources.

8. The device of claim 6 comprising executable instructions performing the query against archived resources.

9. The device of claim 6 wherein the step of performing the semantic analysis on the on the metadata includes the substeps of:

relating resource metadata, and accumulating the selected resource metadata into a query.

10. The device of claim 6 comprising allowing pinning of extracted metadata displayed on a screen to define a query in either batch mode or real time.

* * * * *

UNITED STATES PATENT AND TRADEMARK OFFICE
CERTIFICATE OF CORRECTION

Patent No.: 6,028,605

Dated: February 22, 2000

Inventor(s): Tom Conrad, et al.

It is certified that error appears in the above-identified patent and that said Letters Patent is hereby corrected as shown.

IN THE CLAIMS:

Claim 4, col. 12, line 37, "semantic analysis on the on the metadata" should read --semantic analysis on the metadata--.

Claim 9, col. 13, line 4, "semantic analysis on the on the metadata" should read --semantic analysis on the metadata--.

Signed and Sealed this

Twentieth Day of February, 2001

Attest:

NICHOLAS P. GODICI

Attesting Officer

Acting Director of the United States Patent and Trademark Office